M. COFFIN.
Velocipede.
No. 107,226.
Patented Sept 13, 1870.
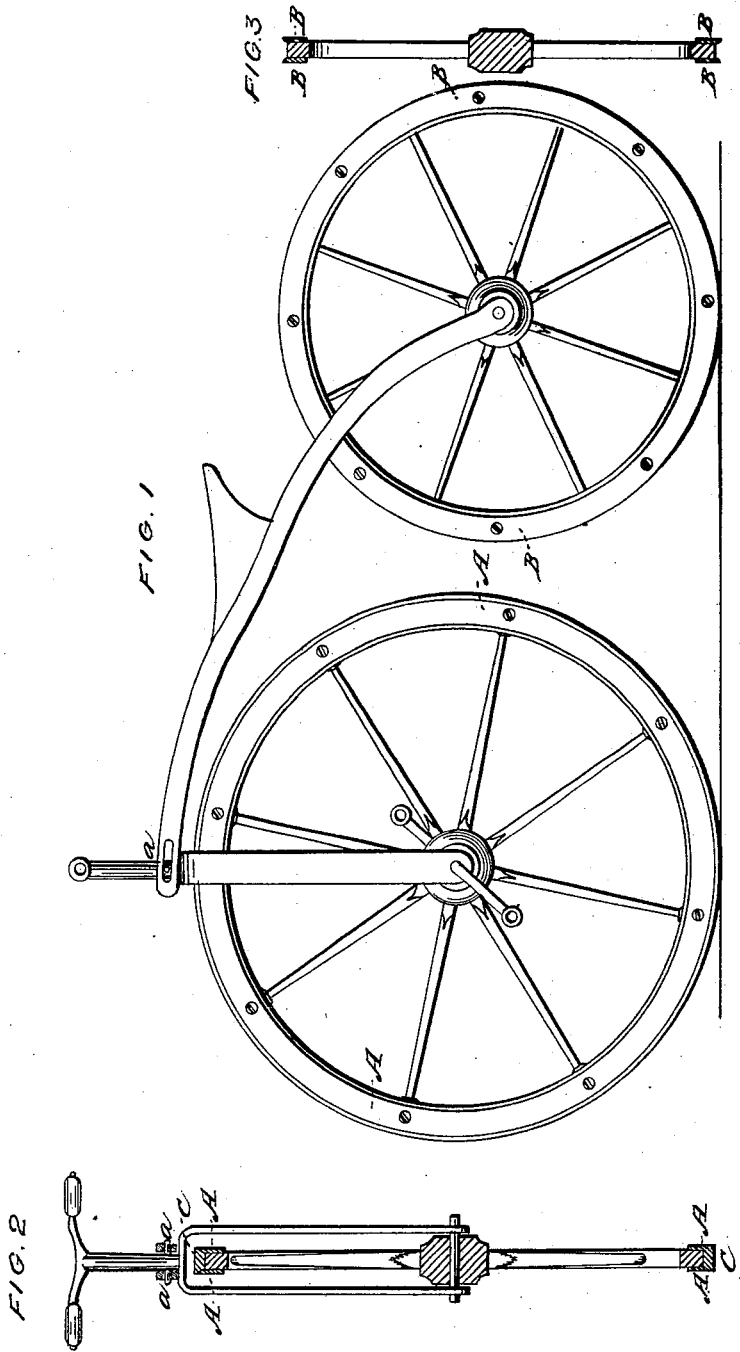

United States Patent Office.

MARK COFFIN, OF MILTON, KENTUCKY.

Letters Patent No. 107,226, dated September 13, 1870.

IMPROVED ICE-VELOCIPEDE.

The Schedule referred to in these Letters Patent and making part of the same

*To all whom it may concern:*

Be it known that I, MARK COFFIN, of Milton, in the county of Trimble and State of Kentucky, have invented a new and useful Improvement in an Ice-Velocipede; and I do hereby declare that the following is a full, clear, and exact description of the construction and operation of the same, reference being had to the annexed drawings making part of this specification, in which—

Figure 1 is a side view.

Figure 2, a vertical front view in section.

Figure 3, a transverse section of rear wheel or wheels.

To enable others skilled in the art to make and use my invention, I will proceed to describe its construction and operation.

I construct a velocipede in any of the known forms, and attach to the periphery of the driving-wheel a band or tire of rubber or other flexible substance, C, held to its place by a flange, A, of steel, iron, or other suitable metal, secured to each side of the rim or felly, so that the whole can be attached or detached, at will.

The flanges I make with a slight bevel on the edge from the outside, to prevent it from sliding laterally.

The rubber or tire C is to project somewhat beyond the outer edges of the flanges, so that the compression of the rubber will cause the flanges to impinge on the ice, to increase friction between the rubber band and the ice, so as to bear sufficient force to run the machine.

I drive small tacks into the rubber band, in which case it is best to have the rubber of two or more thicknesses, the outside one to be of suitable thickness, so that the tacks will reach through and clinch, to prevent them from working out, or it may be used without the tacks, as desired.

The other wheel or wheels are provided with like flanges, B, but may be used with or without the rubber band, as desired.

What I claim as my invention, and desire to secure by Letters Patent, is—

The metal flanges A A, when provided with beveled edges, and so placed upon a wheel that they will bind and extend beyond its periphery, in the manner shown and for the purpose described.

MARK COFFIN.

Witnesses:
GEORGE CHRISTMAN,
LEWIS P. SARLLS.